(12) United States Patent
Khmelev et al.

(10) Patent No.: US 12,718,212 B1
(45) Date of Patent: Aug. 25, 2026

(54) SYSTEM AND METHOD FOR CONTROLLING 3D PRINTS USING NFTS

(71) Applicant: United Services Automobile Association (USAA), San Antonio, TX (US)

(72) Inventors: Yevgeniy Viatcheslavovich Khmelev, San Antonio, TX (US); Gregory Meyer, San Antonio, TX (US); Seth E. Ethington, McKinney, TX (US); Benjamin D. Ethington, Savannah, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 718 days.

(21) Appl. No.: 18/085,320

(22) Filed: Dec. 20, 2022

Related U.S. Application Data

(60) Provisional application No. 63/292,663, filed on Dec. 22, 2021.

(51) Int. Cl.

| | |
|---|---|
| ***G06Q 20/12*** | (2012.01) |
| ***B29C 64/118*** | (2017.01) |
| ***B29C 64/393*** | (2017.01) |
| ***B33Y 50/02*** | (2015.01) |
| ***G06Q 20/36*** | (2012.01) |

(52) U.S. Cl.
CPC .......... *G06Q 20/123* (2013.01); *B29C 64/118* (2017.08); *B29C 64/393* (2017.08); *G06Q 20/36* (2013.01); *B33Y 50/02* (2014.12)

(58) Field of Classification Search
CPC ...... G06Q 20/123; G06Q 20/36; B33Y 50/02; B29C 64/118; B29C 64/393
USPC .......................................................... 700/117
See application file for complete search history.

(56) References Cited

U.S. PATENT DOCUMENTS

| | | | | |
|---|---|---|---|---|
| 10,846,808 | B1 * | 11/2020 | Posillico | G06Q 20/3678 |
| 2017/0187534 | A1 * | 6/2017 | Scott | H04L 9/3226 |
| 2019/0147174 | A1 * | 5/2019 | Narasimhan | G06Q 10/0838 726/29 |
| 2021/0224535 | A1 * | 7/2021 | Sayers | G06T 7/55 |
| 2021/0342836 | A1 * | 11/2021 | Cella | G06Q 30/0208 |
| 2022/0305378 | A1 * | 9/2022 | Ward | A63F 13/235 |
| 2022/0309491 | A1 * | 9/2022 | Shapiro | G06F 21/64 |
| 2023/0161649 | A1 * | 5/2023 | Bollar | G06F 30/10 719/320 |

* cited by examiner

*Primary Examiner* — Mohammad Ali
*Assistant Examiner* — Joshua T Sanders
(74) *Attorney, Agent, or Firm* — Fletcher Yoder, P.C.

(57) ABSTRACT

A three-dimensional (3D) printer system for printing structures on a property, including a 3D printing apparatus comprising an extruder configured to layer material to manufacture a structure, and a processor configured to receive a non-fungible token (NFT) that includes a blueprint for a printable structure and a numerical index. The numerical index is a number of allowed printing operations for the blueprint. The processor may also determine whether the numerical index is above zero. Additionally, the processor may, in response to determining that the numerical index is above zero, cause the 3D printing apparatus to manufacture the printable structure based on the blueprint, and subtract one from the numerical index after the 3D printing apparatus has manufactured the printable structure.

20 Claims, 4 Drawing Sheets

RECEIVE INDICATION OF MISPRINTED STRUCTURE — 206

ADD 1 TO NUMERICAL INDEX — 208

SYSTEM AND METHOD FOR CONTROLLING 3D PRINTS USING NFTS

CROSS-REFERENCE TO RELATED APPLICATION

The present application claims benefit of and priority to U.S. Provisional Patent Application Ser. No. 63/292,663, titled "SYSTEM AND METHOD FOR CONTROLLING 3D PRINTS USING NFTS," which was filed on Dec. 22, 2021, and which is herein incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, three-dimensional (3D) printing has emerged as a construction and manufacturing technique. Large 3D printing devices may construct homes and other buildings in a quick and repeatable manner. Building plans used by the 3D printing devices are often owned by a third party that sells licenses to use the building plans.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a three-dimensional (3D) printer system for printing structures on a property, including a 3D printing apparatus comprising an extruder configured to layer material to manufacture a structure, and a processor configured to receive a non-fungible token (NFT) that includes a blueprint for a printable structure and a numerical index. The numerical index is a number of allowed printing operations for the blueprint. The processor may also determine whether the numerical index is above zero. Additionally, the processor may, in response to determining that the numerical index is above zero, cause the 3D printing apparatus to manufacture the printable structure based on the blueprint, and subtract one from the numerical index after the 3D printing apparatus has manufactured the printable structure.

In another embodiment, a tangible, non-transitory, computer-readable medium, comprising computer-readable instructions that, when executed by one or more processors, cause the one or more processors to receive a non-fungible token (NFT) comprising a blueprint for a 3D-printable structure and an index. The index indicates a limitation on authorized 3D printing operations for the blueprint. The processor may also, in response to a print request, determine whether the index indicates authorized 3D printing operations are available. In addition to this, the processor may, in response to determining that the index indicates authorized 3D printing operations are available, cause a 3D printing apparatus to manufacture the 3D-printable structure based on the blueprint, and update the index after the 3D printing apparatus has manufactured the 3D-printable structure to indicate an authorized print has been consumed.

In yet another embodiment, a method, comprises receiving, via a controller, a non-fungible token (NFT) comprising a blueprint for a 3D-printable structure and an index. The index is indicative of a number of allowed 3D printing operations for the blueprint. The method also includes determining, via the controller, that the index indicates at least one allowed 3D printing operation is available, in response to determining that the index indicates at least one allowed 3D printing operation is available, causing, via the controller, a 3D printing apparatus to manufacture the 3D-printable structure based on the blueprint, and subtracting, via the controller, one authorized print from the index after the 3D printing apparatus has manufactured the 3D-printable structure.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
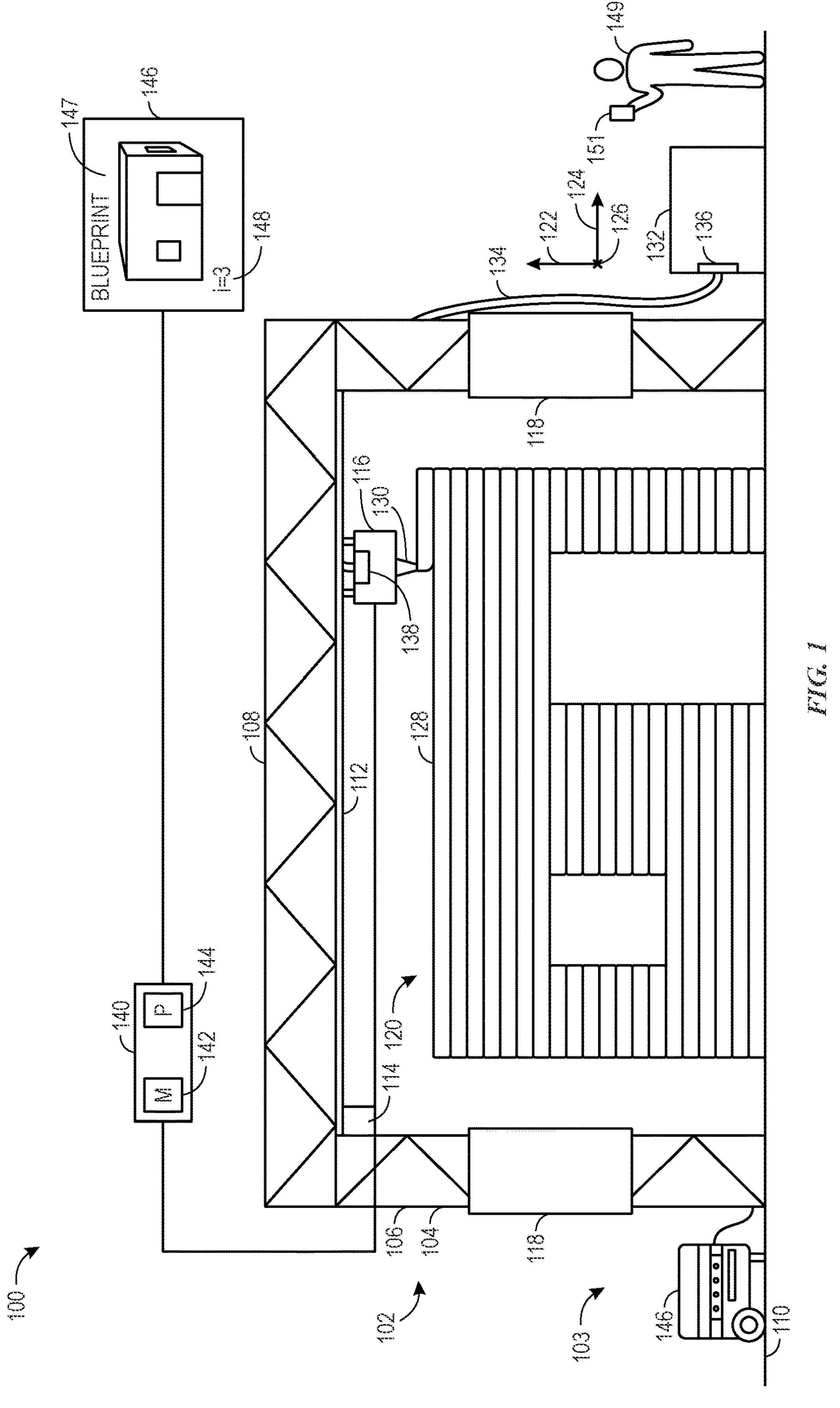
FIG. 1 is a diagram illustrating a three-dimensional (3D) printing system for 3D printing structures, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Alongside traditional construction, new methods for manufacturing buildings and other structures are emerging. One such method is three-dimensional (3D) printing. Large 3D printing apparatuses may layer construction materials (e.g., concrete, insulation, sealant, metal) to automatically construct a building without human intervention. A 3D printing apparatus may construct a building based on a digital building plan. In fact, a digital blueprint may include instructions for 3D printing a structure defined by the digital blueprint. Digital building plans may be the intellectual property of the architect that drafted the digital building plans, a builder, or another owner. Furthermore, the owner may sell licenses to users to utilize a digital building plan for a 3D printing operation. However, it may be desirable for the owner to limit a number of times a user may utilize the building plan.

Non-fungibles tokens (NFTs) have emerged as a type of digital media that may be definitively associated with an owner. As used herein, NFTs are tokens issued on a distributed ledger such as a blockchain. An index includes a counter that is encrypted in metadata of an NFT and stored with the NFT metadata along with data needed for a 3D printer to properly print unique objects or structures. As described below, an index enforces limited runs (e.g., prints) and uniqueness for certain 3D printed structures. NFTs may be any piece of digital media (e.g., a two-dimensional image, a 3D model) and are associated with an owner via a blockchain, or another type of distributed ledger. Once set, the blockchain may be queried to verify that the associated piece of digital media belongs to the owner. Furthermore, the content of the NFT may be edited to reflect updated information. Accordingly, NFTs may be useful for cataloging a number of 3D prints a user is authorized to print. The present embodiments are directed toward a system and method for authorizing a user to run a 3D printing operation based on an NFT, wherein the NFT includes a blueprint for a 3D printed structure, and an index encrypted in the metadata of the NFT limiting a number of 3D prints a user is authorized to print.

FIG. 1 is a diagram illustrating a three-dimensional (3D) printing system 100 for 3D printing structures. The 3D printing system 100 may include a 3D printing apparatus 102 configured to 3D print a structure at a location 103. The 3D printing apparatus 102 may include a frame 104 (e.g., a structure) configured to structurally support and position components of the 3D printing system 100. The frame 104 may be composed of a plurality of structural elements (e.g., trusses, I-beams, pipes, planks) made up of one or more materials (e.g., steel, aluminum, wood, plastic). The frame may include vertical elements 106 and horizontal elements 108. The vertical elements 106 may extend crosswise from a surface 110, while the horizontal elements 108 may extend between the vertical elements 106 to connect the frame 104 as a continuous structure. In addition to connecting the vertical elements 106, the horizontal elements 108 may attach to a conveyance system 112 (e.g., a belt system). One or more motors 114 are configured to position an extruder 116 along the horizontal elements 108 via the conveyance system 112. Additionally, a plurality of actuators 118 may adjust a height of the vertical elements 106. The actuators 118 may be hydraulic cylinders, motor and belt systems, or the like. The conveyance system 112, the one or more motors 114, and the actuators 118 may work in conjunction to position the extruder 116 within a volume 120 defined by the frame 104. The volume 120 extends along a vertical axis or direction 122, a horizontal axis or direction 124, and an additional horizontal axis or direction 126. The conveyance system 112 and the one or more motors 114 may position the extruder 116 along the horizontal direction 124 and the additional horizontal direction 126. The actuators 118 may position the extruder 116 along the vertical direction 122. In certain embodiments, the actuators 118 may manipulate the length of the vertical elements 106. In other embodiments, the actuators 118 may manipulate the position of the horizontal elements 108 along the vertical elements 106 in the direction 122.

The extruder 116 is configured to layer material along the surface 110 and about the volume 120 to form a structure 128 (e.g., a printable structure) during a printing process. The structure 128 may be a residential home, an industrial space, a hospital, a road, a sidewalk, a foundation, or any kind of building or infrastructure. The extruder 116 may include a nozzle 130 configured to deposit material to form the structure 128. The extruder 116 may receive material from a material storage unit 132 via a tube 134. The material storage unit may contain one or more material storage compartments as well as a pump 136 and other components for maintaining and transporting materials. For example, the material storage unit 132 may include compartments containing concrete, asphalt, tar, clay, plastic, sealant, insulation, metal, and other materials for use in construction. The pump 136 may transport the materials along the tube 134 to the extruder 116. In certain embodiments, the extruder 116 may include a heating element 138 for heating certain materials (e.g., plastic) into a malleable state (e.g., after potential cooling during transition from a heated source). During a construction operation, the extruder 116 may deposit material received from the material storage unit 132 via the nozzle 130 to construct the structure 128.

The 3D printing apparatus 102 may be transported to different locations to manufacture structures. For example, in one embodiment, a user may disassemble components (e.g., the vertical elements 106, the horizontal elements 108, the extruder 116) of the 3D printing apparatus 102 and place the components into a vehicle to be transported to an additional manufacturing site. The components may be reassembled into the 3D printing apparatus 102 at the additional manufacturing site, where the 3D printing apparatus 102 may manufacture additional structures. In another embodiment, the 3D printing apparatus 102 may include wheels that may be used to transport the 3D printing apparatus to additional locations.

The 3D printing system 100 may include a controller 140. The controller 140 may include memory 142 and a processor 144. The processor 144 may be any type of computer processor or microprocessor capable of executing computer-executable code. The processor 144 may also include multiple processors that may perform the operations described below. The memory 142 may be any suitable articles of manufacture that can serve as media to store processor-executable code, data, or the like. These articles of manufacture may represent computer-readable media (e.g., any suitable form of memory or storage) that may store the processor-executable code used by the processor 144 to perform the presently disclosed techniques. The memory 142 may also be used to store data (e.g., identification data, data related to construction metrics, sensor measurements, printing characteristics, site measures, calculations, a lookup table, user inputs, and so forth), various other software applications for analyzing the data, and the like. The memory 142 may represent non-transitory computer-readable media (e.g., any suitable form of memory or storage) that may store the processor-executable code used by the processor 144 to perform various techniques described herein. It should be noted that non-transitory merely indicates that the media is tangible and not a signal.

The controller 140 may be communicatively coupled to the one or more motors 114, the extruder 116, the actuators 118, and the pump 136, or any other controllable part of the 3D printing system 100. The controller 140 may control operation of the 3D printing apparatus 102. In certain embodiments, the controller 140 may be located in the immediate vicinity of the 3D printing system 100 (e.g., the location 103). In other embodiments, the controller 140 may be remote from the 3D printing system 100. In either embodiment, the controller 140 may communicatively couple to the components of the 3D printing apparatus 102 via a Wi-Fi network, a 4G network, a 4G LTE network, a 5G network, a Bluetooth network, a near field communication (NFC) network, a local area network (LAN), or any other means of data communication. The controller 140 and the 3D printing apparatus 102 may be powered by a generator 145 or any source of electricity.

The 3D printing apparatus 102 may construct the structure 128 based on a non-fungible token (NFT) 146 including or incorporating a blueprint 147 (e.g., a digital building plan). The blueprint 147 may be a two-dimensional (2D) or 3D digital representation of the structure 128 and may include instructions for 3D printing of the structure 128. Specifically, the blueprint 147 may include a visual recreation of the structure 128 that further includes construction information such as dimensions, materials, estimated cost, compatible 3D printer models, compatible environmental conditions, design variations based on lot size, climate preferences or requirements, topography, and/or other data pertinent to construction. The NFT 146 is issued on a global ledger and may be sold by an owner as a license to manufacture a set number of structures based on the blueprint 147. The controller 140 may utilize the blueprint 147 to control the 3D printing apparatus 102 to construct the structure 128 depicted in the blueprint 147. Additionally, the NFT 146 may include editable metadata comprising an index 148 (e.g., a numerical index) encrypted therein. The index 148 represents a number of remaining prints a user 149 is allowed to 3D print (e.g., a limitation on 3D printing operations for the blueprint 147, a number of 3D printing operations that are available). The index is not stored locally, but it stored in the editable metadata in a global ledger alongside the NFT 146. The user 149 may be an individual, a company, or any entity able to purchase the NFT 146 and perform or utilize 3D printing operations.

The 3D printing apparatus 102 may insert a radio-frequency identification (RFID) chip 152 during a 3D printing process. The RFID chip 152 may include data related to the NFT 146 (e.g., an address, a copy of the blueprint 147, data concerning the NFT 146, the index 148). To facilitate accessing the data on the RFID chip 152, the device 151 may include an RFID reader. In one embodiment, the controller 140 causes the 3D printing apparatus 102 to print the structure 128. Subsequently, the controller 140 connects to a blockchain associated with the NFT 146 to edit the metadata of the NFT 146 by subtracting one from the index 148 after the 3D printing apparatus 102 has manufactured the structure 128. For example, the user 149 may purchase an NFT (e.g., the NFT 146) containing the blueprint 147 and three licensed prints. Accordingly, the index 148 is three in this example. After a 3D printing operation based on the blueprint 147, the controller 140 connects to the blockchain and edits the NFT 146 to subtract one from the index 148, resulting in an index 148 of two. With an index 148 of two, the user 149 has two remaining print authorizations using the blueprint 147. If the index is zero, the controller 140 prevents the 3D printing apparatus 102 from printing a structure based on the blueprint 147 of the NFT 146 because there are no further authorizations associated with that index. The NFT 146 may be purchased with a variety of different index values corresponding to different NFT costs. For example, an NFT with an index of five may cost more than an NFT with an index of two. The cost of an NFT may increase with an increase in index value. The index value corresponds to a number of 3D prints based on the blueprint 147 that may be printed. Alternatively, instead of purchasing an NFT ahead of time, the user 149 may make a payment at the time of initiating a printing operation. The user 149 may choose from a number of selections displayed on the device 151. The user may choose design variations of the blueprint 147 (e.g., change the number of rooms, different colors, different materials). Each design may have a different cost. A method for limiting a number of prints available for the user 149 is detailed below.

Figures 2, 3:
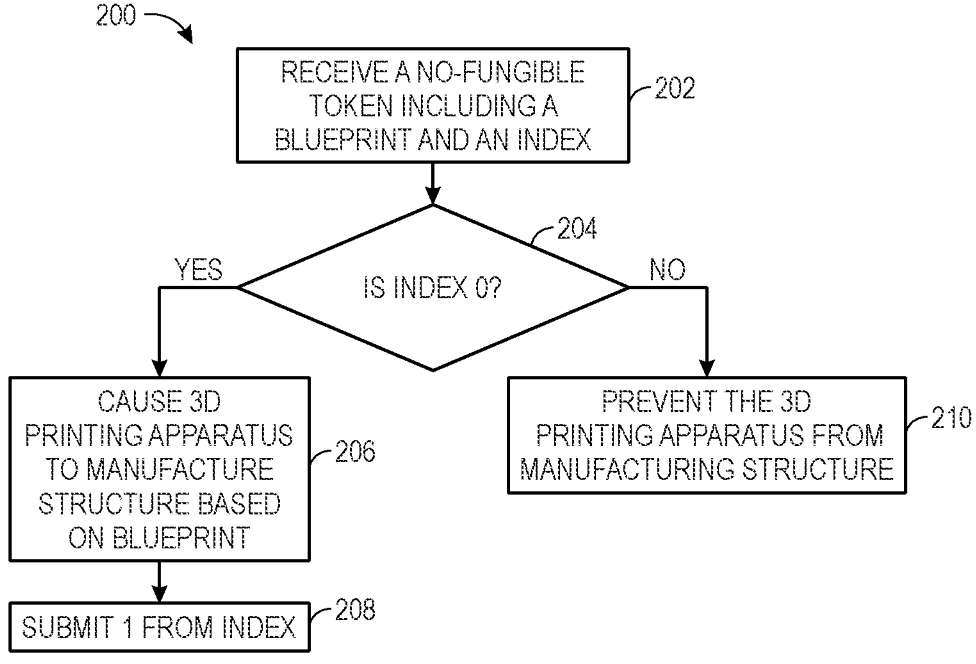
FIG. 2 is a flow chart illustrating a method for limiting a number of times a user may utilize a blueprint for a 3D printing operation, in accordance with embodiments described herein.
FIG. 3 is a flow chart illustrating a method for giving a user additional print authorization in response to a misprint, in accordance with embodiments described herein.

Turning to the next figure, FIG. 2 is a flow chart illustrating a method 200 for limiting a number of times the user 149 may utilize the blueprint 147 for a 3D printing operation. Although the following description of the method 200 is described in a particular order, it should be noted that the method 200 is not limited to the depicted order; and, instead, the method 200 may be performed in any suitable order. This method 200 (or algorithm) may be performed by the controller 140, in accordance with present embodiments.

At block 202, the controller 140 receives the NFT 146 (e.g., including the blueprint 147 and index 148). The NFT 146 may be received from a software wallet, a hardware wallet, a file system, or another appropriate NFT storage location. In certain embodiments, the controller 140 may receive an address associated with the NFT 146 and retrieve or otherwise access the NFT 146 using the address. In another embodiment, the controller 140 may receive data contained in the NFT 146 (e.g., ownership data, history data, the blueprint 147, the index 148) directly.

At block 204, the controller 140 determines whether the index 148 of the NFT 146 is equal to zero. The controller 140 may connect to a blockchain associated with the NFT 146 to check the current value of the index 148. In one embodiment, the controller 140 may make the determination in response to a user request to begin a 3D printing operation based on the blueprint 147 of the NFT 146. In another embodiment, the user 149 may input the request via the device 151. If the index 148 is an integer greater than zero, the method 200 proceeds to block 206. If the index 148 is zero, the method 200 proceeds to block 210.

At block 206, the controller 140 causes the 3D printing apparatus 102 to manufacture the structure 128 based on the blueprint 147. The controller 140 may cause the one or more motors 114 and the actuators 118 to maneuver the extruder 116 about the volume 120, starting at the surface 110. The extruder 116 may deposit material (e.g., concrete, insulation, metal, tar, adhesives) in layers to manufacture a structure (e.g., a residential home, a building, a road). The controller 140 may generate a serial number for the structure 128. The controller may store the serial number on the NFT 14 and the RFID chip 152. In certain embodiments, the controller 140 may halt the 3D printing operation when a connection between the controller 140 and the blockchain associated with the NFT 146 is lost.

At block 208, the controller 140 subtracts one from the index 148 (e.g., upon successful completion of a 3D print job based on the blueprint 147). The controller 140 may edit the NFT 146 so that the value of the index 148 after the 3D printing operation is one less than the value of the index 148 before the 3D printing operation described at block 206. In one embodiment, the controller 140 may subtract one from the index 148 immediately after the user 149 inputs a request to begin a 3D printing operation based on the blueprint 147. In another embodiment, the controller 140 may subtract one from the index 148 after the 3D printing operation is complete. In another embodiment, the controller 140 may subtract one form the index 148 in response to receiving an image depicting the complete printed structure (e.g., a confirmatory image). The controller 140 may compare the image to the blueprint 147 to confirm sufficient overlap (e.g., accuracy within a threshold) to indicate a successful 3D printing occurred. In yet another embodiment, the user 149 requests a 3D printing operation wherein multiple structures are printed based on the blueprint 147. The controller 140 compares the index 148 to a number of requested structures and, if the index is equal to or greater than the requested number of structures, initiates the 3D printing operation. After the 3D printing operation is complete, the controller 140 subtracts a number equal to the number of printed structures from the index 148. The controller 140 may send a notification to a device associated with the user in response to detecting that the index is equal to zero (e.g., receiving an indication of no further printing authorizations).

At block 210, the controller 140 prevents the 3D printing apparatus 102 from manufacturing the structure 128 based on the blueprint 147. The controller 140 may prevent the 3D printing apparatus 102 from printing a structure based on the blueprint 148, prevent the 3D printing apparatus 102 from printing any structures for a period of time, deactivate the 3D printing apparatus 102 altogether, cause the 3D printing apparatus 102 to manufacture a structure that is different than the structure depicted in the blueprint 147, or delete the blueprint 147 from the NFT 146. In response to an attempted printing operation, the controller 140 may send a notification to an owner of the NFT 146. The controller 140 may cause the device 151 to display a prompt to add prints. That is, the 3D printing system 100 may allow the user 149 to add integers to the index 148. In one embodiment, the user 149 may send a request to the owner of intellectual property rights to the blueprint 147 to increase the value of the index 148 of the NFT 146. In another embodiment, the user 149 may make an immediate payment to increase the value of the index 148. For example, if, after one or more 3D printing operations, the index 148 is zero, the user 149 may pay a fixed amount of money to add one or more integers to the index 148. The controller 140 may also add to the index 148 in response to a 3D printer error causing a misprint. A cost of each integer of the index 148 may decrease as more integers are purchased in a single purchase. That is, integers of the index 148 may be less expensive when purchased in bulk. Additionally, the owner of the NFT 146 may increase or decrease the cost of adding to the index 148. A user 149 may also sell integers of the index 148 back to the owner of the NFT 146. For example, a user may initially purchase five prints of a structure. However, the user may decide to only print three structures. The user may then sell the remaining two integers of the index 148 to the owner of the NFT 146. The owner of the NFT 146 may set a resell price for the integers.

In some embodiments, multiple indexes may be employed to control printing based on location, printing device, associated user, and so forth. For example, a certain printing device may be limited based on its identification and authorization. Likewise, printing associated with a particular user may be limited. As another example, an index may be provided for printing in a first geographical region and a separate index may be provided for printing in a second geographical region (different than the first geographical region). Location information (e.g., location of the print operation, which may be the current location of the printing apparatus) may be required to be presented by a printer before printing authorization is given. In this way, use of a blueprint can be limited based on location (e.g., only a limited number of houses may be allowed to be printed in a particular neighborhood). Likewise, there can be distance thresholds that prevent printing of similar structures next to each other or within a line of sight of each other (e.g., as detected based on computer generated models and surveying data). This may be beneficial to avoiding essentially identical houses being printed next to each other, in one example, FIG. 3 is a flow chart illustrating a method 300 for giving the user 149 an additional print authorization in response to a misprint. Although the following description of the method 300 is described in a particular order, it should be noted that the method 300 is not limited to the depicted order; and, instead, the method 300 may be performed in any suitable order. This method 300 (or algorithm) may be performed by the controller 140, in accordance with present embodiments.

At block 302, the controller 140 receives a misprint indication. The misprint indication comprises data indicating that the structure 128 based on the blueprint 147 has faulty features caused by a faulty printing operation or the like. A misprint may result from an error on the part of the 3D printing apparatus 102, damage caused by an outside factor (e.g., weather, human activity), user error, software error, and the like. A misprint may result in warped structure, gaps and holes in walls and floors, weakened structural members, and other defects. In one embodiment, the misprint indication is a message indicating that the structure 128 was misprinted. The 3D printing apparatus 102 may generate the misprint indication in response to one or more sensors indicating a misprint. For example, a camera of the 3D printing apparatus 102 may detect warping in the manufactured structure. In another example, torque sensors installed in the one or more motors 114 may indicate that the motors 114 are experiencing resistance (e.g., resistance caused by an obstruction, such as a misprinted layer or portion of a layer). In response to the detected misprint, the controller 140 may generate and send the misprint indication. In another embodiment, the misprint indication may be an image depicting a misprinted structure. The image may be provided in conjunction with data that authenticates the misprinted structure as an authorized attempt. For example, actual data from a printing (e.g., location data, time stamps, printing material data, weather data) may be used to compare with metadata and visual data of the image to confirm it was an authorized printing attempt. The user 149 may capture the image depicting the misprinted structure using a device with a camera (e.g., the device 151). The controller 140 may compare the image to a database of images (e.g., including associated metadata, such as metadata indicating a location of the image) to ensure the image is a unique and authentic image (e.g., obtained at an authorized location for printing) of a misprinted structure. The user 149 may also submit a misprint report comprising information about the misprint (e.g., the nature of defects in the structure, the cause of the misprint). For example, hot weather during a 3D printing operation may cause material warping as the 3D printing apparatus 102 prints the structure 128 based on the blueprint 147. In response, the user 149 may capture an image of the warped structure to use as a misprint indication. The user may also create a misprint report comprising a description of the warping and the hot weather that caused the warping. The user 149 may send the misprint indication and misprint report to the controller 140 using the device 151, or another suitable device.

At block 304, the controller 140 adds to the index 148 (or prevents subtracting a print authorization from the index). In one embodiment, the controller 140 may automatically add to the index 148 (e.g., grant additional prints) in response to the misprint indication. In another embodiment, the controller 140 may forward the misprint indication and the misprint report to a device associated with the owner of the intellectual property rights to the blueprint 147. The 3D printing system 100 may enable the owner to grant one or more additional prints after considering the misprint indication and the misprint report. This may be done remotely via communication features (e.g., communication ports, transmitters) of the system 100. The owner may send an indication (e.g., via a system message, email, text message) to the controller 140 to add to the index 148. In response, the controller 140 adds one or more print authorizations to the index 148. In another embodiment, the controller 140 adds more than one integer to the index 148. In yet another embodiment, a user may opt to receive a refund instead of an additional integer of the index 148.

Figure 4:
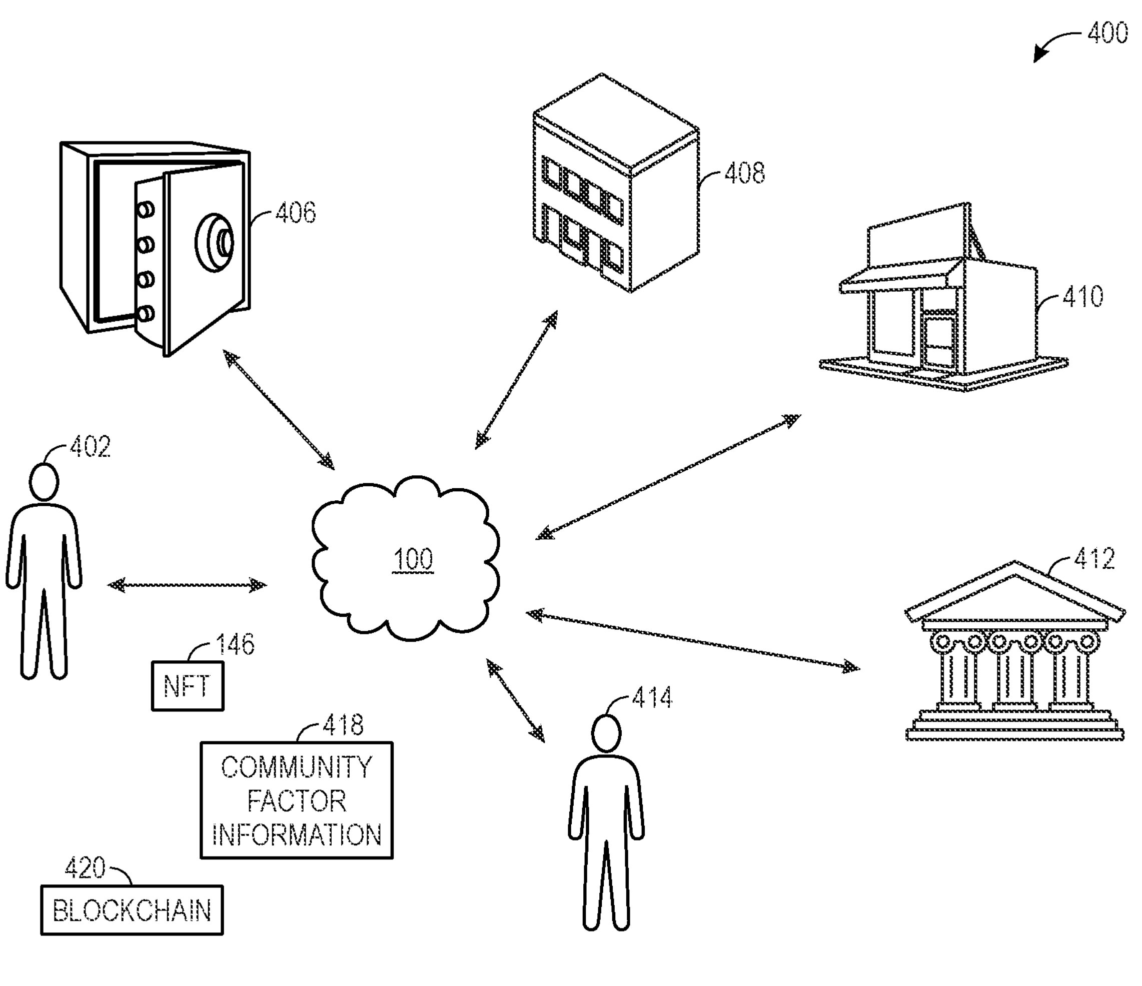
FIG. 4 is a schematic illustration of an environment in which a non-fungible token management system may operate, in accordance with an embodiment.

FIG. 4 illustrates an example environment 400 in which the system 100 may operate, in accordance with embodiments described herein. A user 402 can interact with and access the NFT management system 404 via a user device, such as a mobile device that is implemented as a computing device as provided herein. The system 100 may provide NFT management services to a large number of different organizations or individuals, and may act as a clearinghouse for various types of NFT transactions. For example, the NFT system 100 may permit one or more NFT transactions of the user 402, a cloud storage system 406, companies and institutions 408, merchants and retailers 410, financial institutions 412, and other users 414. The system 100 facilitates interactions with one or more NFTs 146, which may be stored in the system 100, identified via the system 100, accessed via the system 100, and/or authenticated by the system 100.

In some embodiments, the NFT system 100 may facilitate user authentication, which is a technology area that deals with identifying individuals in a system (such as a country, a network, or an enterprise) and controlling access to resources, such as managed NFTs 146, within that system by associating user rights and restrictions with user-associated NFTs and permitting user transactions with NFTs that are owned by the user or that are permitted by an owner of an NFT, which may be facilitated in the system 100. In general, the NFT system 100 may maintain user information for the user 402, companies and institutions 408, merchants and retailers 410, financial institutions 412, other users 414, and the like. In addition, the system facilitates and maintains NFT identification information and NFT digital data, which can be under user control.

Some of the features that may be provided by the NFT system 100 includes access to NFT transactions from a mobile application, an embedded application operating on the user device, or a web application. In certain embodiments, the NFT system 100 may securely store identity attributes of an NFT 146 on a blockchain.

As provided herein, an NFT 146 is a token used to represent ownership of one or more unique items. Accordingly, the NFT 146 may refer to a blockchain address or hash associated with the NFT 146 that includes a fixed number of alphanumeric characters generated from a public and private key pair. The NFT 146 may also include digital raw or compressed data representative of the NFT 146 and that is associated with a unique blockchain address. As provided herein, the system 100 may store the identifier hash, while the digital data of the NFT 146 is stored elsewhere, e.g., the digital data of the NFT (e.g., the image data, the audio data) is stored off-chain. In embodiments, the system 100 also stores the digital data of the NFT 146. The NFT 146 may also include metadata (e.g., a JSON file) associated with the digital NFT data. Ownership of the NFT 146 may include ownership of hex values encoding transaction elements, such as function names, parameters, and return values, and that are used to access NFT data.

The NFT 146 may, in embodiments, be a type of cryptocurrency that uses smart contracts. However, in contrast to digital coins, which are fungible, each NFT 146 is digitally unique such that no two NFTs 146 are the same. For example, even for items that are multiples of one another (e.g., multiple digital copies of an artwork), each NFT 146 would still have a unique identifier (e.g., a bar code), with only one owner. The intended scarcity of the NFT 146 is set by the creator. A creator may intend to make each NFT 146 completely unique to create scarcity or produce several thousand replicas (each replica having its own unique, non-fungible identifier, similar to an artist print marked as 1/10). Every NFT 146 has an owner of public record that can be verified. In embodiments, NFT creators can retain ownership rights over their own work, and claim resale royalties directly. Thus, the owner of the NFT 146 may have financial arrangements or royalty arrangements that are dictated within the smart contracts of the NFT record.

Creation or minting of an NFT 146 involves confirmation of the NFT 146 as an asset on the blockchain, and the owner's account balance is updated to include that asset. This makes it possible for the NFT 146 to then be traded or verifiably owned. The transactions that confirm the above are added to a block on the chain. The block is confirmed by everyone in the network as correct. This consensus removes the need for intermediaries because the network verifies the NFT 146 and ownership. As provided herein, the NFT 146 may be created on the Ethereum blockchain. In an embodiment, the NFT 146 is part of the ERC-721, ERC-1155, and/or EIP-2309 standard.

The NFT system 100 may employ a blockchain infrastructure to perform NFT management utilized in connection with digital transactions such as NFT minting (e.g., NFT creation), authentication, storage, or financial transactions (e.g., NFT purchasing or exchange, valuation, insurance). In general, blockchains are continuously growing lists of records (e.g., blocks), which are linked and secured using cryptography, for example. By using a blockchain infrastructure that enables the functionality of smart contracts, the methods and systems described herein allow a persistent, replicated, public, and automated database for transactions that involve NFTs.

As such, the embodiments described herein include methods and systems for deployment, maintenance, and interaction with the distributed ledgers and smart contracts to facilitate NFT management for the purpose of performing digital transactions (e.g., financial transactions, exchanges of information). The embodiments described herein may include blockchain techniques, as well as the terminals and servers that operate blockchain nodes, as described herein. Technical advantages of the embodiments described herein also include the use of public and/or private blockchains to perform automated, trusted operations for the purpose of conducting digital transactions involving NFTs 146. The systems described herein allow the performed operations to be transparent and tamper-proof and, thus, may increase the accuracy of, and security with, conducting digital transactions. Moreover, the techniques described herein may also reduce network congestion by, for example, reducing the amount of data transferred between entities that communicate using a network or between two different portions of one entity communicating using a network.

Referring again to FIG. 4, in certain embodiments, the blockchain 420 may be a public or private ledger of all transactions that have been executed in one or more contexts (e.g., negotiable instrument transactions, digital currency transactions, access determinations, instances of providing access, reviews, etc.). The blockchain 420 may grow as completed blocks are added with a new set of transactions by the NFT system 100. In certain embodiments, a single block is provided from multiple transactions (e.g., multiple statements of authenticity for the NFT 146). In general, blocks are added to the blockchain 420 in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain 420, which is automatically downloaded to the node upon joining the peer-to-peer network. The blockchain protocol provides a secure and reliable method of updating the blockchain 420, copies of which are distributed across the peer-to-peer network, without use of a central authority.

The infrastructure described above may be accessed by an application program interface (API). The API may be accessed from an access node. The API may provide users with an interface to the NFTs 146. The API may be loaded as an interface in an access node, or a resource available on the internet that may be accessed using a network application (e.g., a browser) in the access node of the system 100. The API may convert the state and the functions of an online NFT transaction to binary code for storage and execution by miners of the blockchain 420. The API may also convert (e.g., compile) transactions or information requests to a binary message that may be transmitted to the blockchain 420 for execution by miners.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a particular transaction. The blockchain 420 enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain 420). In certain embodiments, the blockchain 420 may also employ other protocols. In this context, the work is a task that is difficult for any single node (e.g., computing device) in the peer-to-peer network to quickly complete, but is relatively easy for a node (e.g., computing device) to verify.

The peer-to-peer network includes miners (e.g., computing devices) that add blocks to the blockchain 420 based on the blockchain protocol. In general, multiple miners validate transactions that are to be added to a block, and compete (e.g., perform work, as introduced above) to have their block added to the blockchain 420. Validation of transactions includes verifying digital signatures associated with respective transactions. For a block to be added to the blockchain 420, a miner must demonstrate a proof of work before their proposed block of transactions is accepted by the peer-to-peer network, and is added to the blockchain 420. In certain embodiments, the blockchain protocol includes a proof of work scheme that is based on a cryptographic hash function (CHF). In general, the CHF receives information as input, and provides a hash value as output, the hash value being of a predetermined length. In certain embodiments, the hash value is a one-way hash value, in that the hash value cannot be "un-hashed" to determine what the input was. In certain embodiments, the blockchain protocol may require multiple pieces of information as input to the CHF. For example, the input to the CHF may include a reference to the previous (most recent) block in the blockchain 420, details of the transaction(s) that are to be included in the to-be-created block, and a nonce value (e.g., a random number used only once).

Multiple nodes may compete to hash a set of transactions and provide the next block that is to be added to the blockchain 420. In certain embodiments, the blockchain protocol provides a threshold hash to qualify a block to be added to the blockchain 420. For example, the threshold hash may include a predefined number of zeros (Os) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain 420. Each miner provides the reference to the previous (most recent) block in the blockchain 420, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain 420. Consequently, the respective miner's block is broadcast across the peer-to-peer network. All other miners cease work (because one miner was already successful), and all copies of the blockchain 420 are updated across the peer-to-peer network to append the block to the blockchain 420. Each miner may be required to produce hundreds or thousands of hash values, before any one miner provides a qualifying hash value (e.g., at least the first four characters of the hash value are each zero).

In certain embodiments, the distributed ledger (or blockchain 420) system may include one or more sidechains. A sidechain may be described as a blockchain 420 that validates data from other blockchains 420. In certain embodiments, a sidechain enables ledger assets (e.g., a digital currency) to be transferred between multiple blockchains 120. In certain embodiments, the blockchain 420 may be a public blockchain, such that data stored on the blockchain 420 is generally accessible. In other embodiments, the blockchain 420 may be a private blockchain, such that the stored data is accessible only to authorized individuals and/or processes on the blockchain 420. In certain embodiments, the blockchain 420 may also be a hybrid of public and private blockchains. For example, the NFT system 100 may utilize a privately managed, but publicly readable blockchain 420. In this manner, some identity information about a user may be stored in a sidechain. In certain embodiments, the NFT system 100 may store multiple different NFTs 146 associated with respective different users 102.

Figure 5:
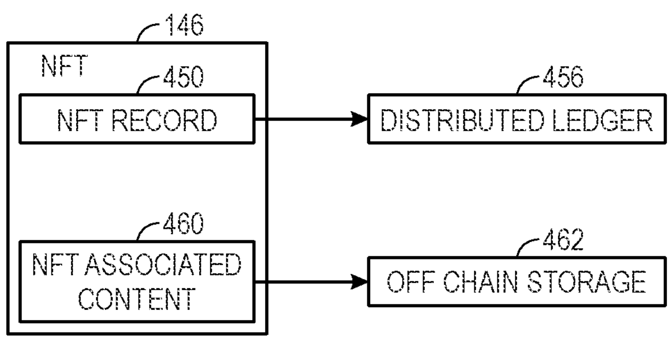
FIG. 5 is a block diagram of a non-fungible token storage arrangement, in accordance with an embodiment.

FIG. 5 shows an example NFT 146 and storage arrangement that includes an NFT record 450, e.g., a token, such as a hash, that is stored and validated in a distributed ledger 456, e.g., a blockchain record. The NFT record 450 includes ownership information and transaction histories. The NFT record 450, as discussed herein, includes a unique identification that uniquely identifies NFT associated content 460, which can be one or more files that includes the digital data of the NFT 146, such as image files, video files, audio files, game item files, or any suitable NFT associated content 460. The NFY associated content 460 may include metadata. While the NFT record 150 is stored in the distributed ledger 456, e.g., a blockchain, storing the NFT associated content 460 in a distributed ledger format may be prohibitively expensive, particularly for larger files. Accordingly, NFT associated content 460 can be stored in an off-chain storage 462. The location of the off-chain storage 462 at the time the NFT 146 was minted can be specifically referred to in the NFT record 450. For example, the NFT record 450 can include a url link to the NFT associated content 460.

In certain embodiments, the NFT 146 may include seed information that populates variables for a fixed NFT generation algorithm, e.g., an image or audio generation algorithm. Each seed can be a hexadecimal string generated in a random or pseudorandom manner at the time the token is minted. However, the algorithm is fixed, such that using a specific seed provides identical result each time. In embodiments, the seed can be stored as part of the NFT record 450 on the distributed ledger 456. The algorithm can be stored as part of the NFT record 450 and/or stored in off-chain storage 462. In this manner, the NFT associated content 460 can be generated on demand using the algorithm and the seed. This may permit greater on-chain storage capabilities, without requiring storage of large data files that are expensive to mint. The seed, and algorithm in embodiments, can be relatively small and inexpensive to record in the distributed ledger 456.

Off-chain storage 462 solutions are typically set by the minter of the NFT 146, and can vary in quality and security. For example, the off-chain storage can be a website, and the NFT record 450 can refer to an HTTP address. However, website access can be shut down if the account holder abandons the site. Further, the owner of the website can alter or replace the original NFT associated content 460. Other storage solutions may be longer-term or more stable, such as storage in InterPlanetary File System (IPFS) or Arweave. In IPFS storage, any added file is given its own unique identifier that acts as a permanent record of the file. Therefore, NFT associated content 460 stored off-chain in an IPFS storage may have a unique token identifier as part of the NFT record 450 and may also have a storage record, such as a content identifier (CID), as part of the stored file in the off-chain storage 462. Accordingly, different NFTs 146 may have different data persistence or mutability based on the quality of the off-chain storage 462.

The NFT purchaser may wish to store the NFT 146 privately to create scarcity of the NFT associated content 460. In an embodiment, the NFT system 100 can include off-chain storage 462 with controlled or user-set access for managed NFTs 146. Thus, the NFT system 100 addresses uncertainties caused by an unsecured link between the NFT record 450 and the NFT associated content 460.

Further, the purchaser of the NFT 146 may be at arms length from the original creator (minter) of the NFT 146 and may not have any way of contacting the creator to alter the storage arrangements or authenticate the NFT associated content 460. Disclosed embodiments of the NFT system 100 include improved authentication of the NFT associated content 460 for downstream purchasers of the NFT 146, which in turn may permit controlled storage of an authenticated copy of the NFT associated content 460. A user of the NFT system 100 may wish to control storage of a purchased NFT 146 or have access to an authenticated copy of the associated content 160 that is stored in a secure storage location.

Figure 6:
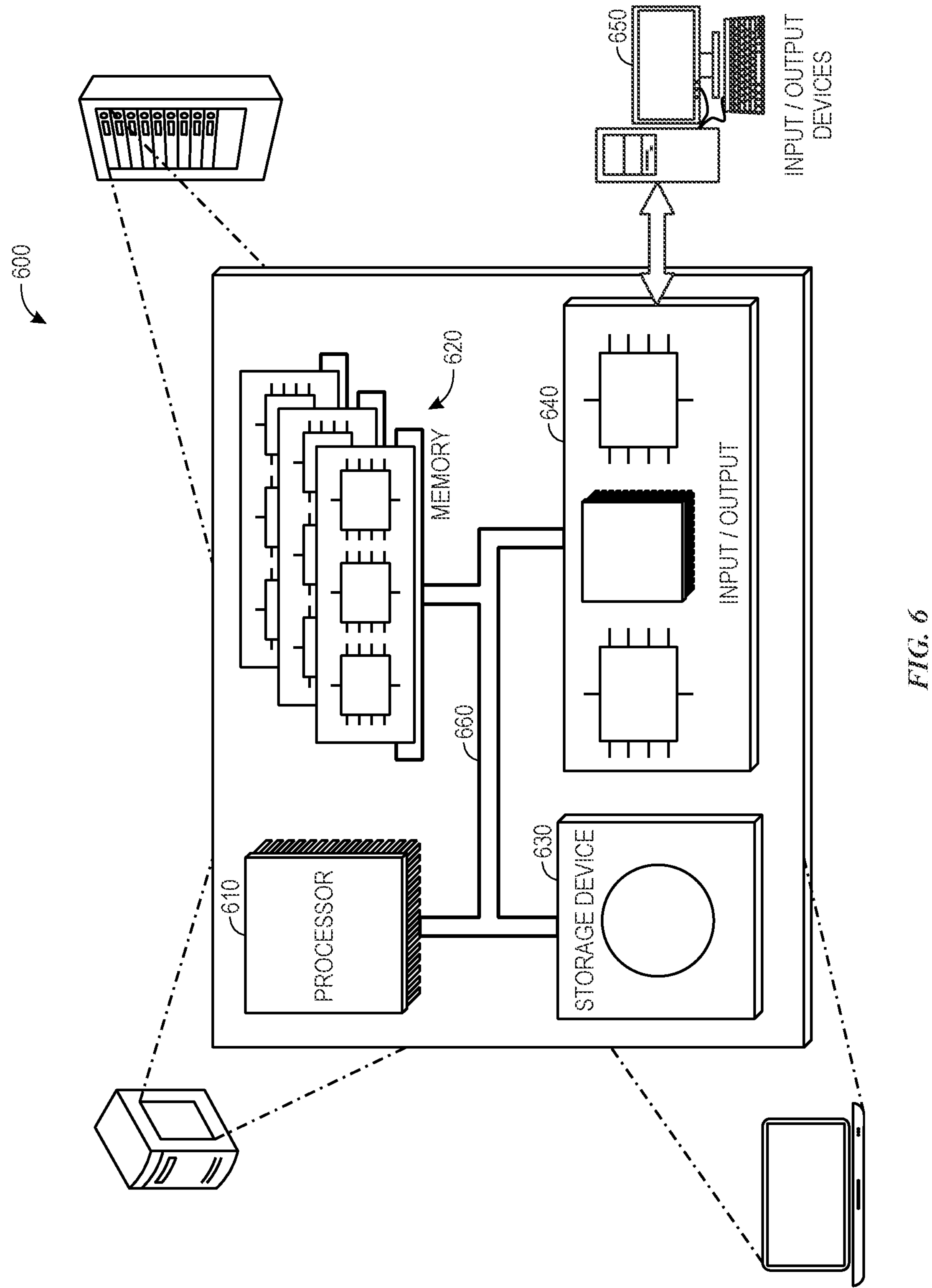
FIG. 6 is a schematic illustration of an example computing system, in in accordance with an embodiment.

FIG. 6 illustrates an example computing system 600 that the embodiments described herein may use to perform their respective operations. The system 600 may be used for any of the operations described with respect to the various embodiments described herein, including the NFT system 100 described herein. For example, the system 600 may be included, at least in part, in one or more of computing device(s) or system(s) described herein. In certain embodiments, the system 600 may include one or more processors 610, one or more memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

In certain embodiments, the processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 may execute instructions for the various software module(s) described herein. The processor(s) 610 may include hardware-based processor (s) each including one or more cores. The processor(s) 610 may include general purpose processor(s), special purpose processor(s), or both.

In certain embodiments, the memory 620 may store information within the system 600. In certain embodiments, the memory 620 includes one or more computer-readable media. The memory 620 may include any number of volatile memory units, any number of non-volatile memory units, or both volatile and non-volatile memory units. The memory 620 may include read-only memory, random access memory, or both. In certain embodiments, the memory 620 may be employed as active or physical memory by one or more executing software modules.

In certain embodiments, the storage device(s) 630 may be configured to provide (e.g., persistent) mass storage for the system 600. In certain embodiments, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In certain embodiments, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 610 and the memory 620 may be supplemented by, or incorporated into, one or more application-specific integrated circuits (ASICs).

In certain embodiments, the system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600 or may be external on one or more computing devices of the system 600.

In certain embodiments, the system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-832 standard for serial ports, or with a version of the IEEE AA884 standard for parallel ports. As another example, the I/O interface(s) 640 may be configured to provide a connection over Universal Serial Bus (USB) or Ethernet. In certain embodiments, the I/O interface(s) 640 may be configured to provide a serial connection that is compliant with a version of the IEEE AA994 standard.

In certain embodiments, the I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments of the system 600 may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 600 that includes a back-end component, e.g., as a data server, or that includes a middleware component, e.g., an application server, or that includes a front-end component, e.g., a client computer having a graphical user interface or a web browser through which a user may interact with an with the system 600, or any appropriate combination of one or more such back-end, middleware, or front end components. The components of the system 600 may be interconnected by any appropriate form or medium of digital data communication, e.g., a communication network. Examples of communication networks include a local area network ("LAN") and a wide area network ("WAN"), e.g., the Internet.

In certain embodiments, the computing system 600 may include clients and servers. A client and server are generally remote from each other and typically interact through a communication network. The relationship of client and server arises by computer programs running on the respective computers and having a client-server relationship to each other.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to their information and/or constraints on such access. The interface may also enable the user to view information such as transaction history that is stored on the distributed ledger. In certain embodiments, a history may provide an auditable history of transactions, which are mediated by the smart contract(s) on the distributed ledger. Additionally, it should be noted that the smart contract(s) executing on a distributed ledger may make access authorization decisions based on permission information stored on the distributed ledger. In certain embodiments, the distributed ledger may be a blockchain, such as blockchain 420.

Embodiments of the present disclosure are also directed to secure device management. More particularly, embodiments of the present disclosure are directed to managing a network of devices using information and/or computer programming code on a distributed ledger system such as a blockchain. The computer programming code may include smart contracts, which may also be described as self-executing contracts, blockchain contracts, digital contracts, and/or chain code. As used herein, a smart contract refers to computer programming code executed by a distributed ledger system.

For instance, smart contracts may refer to distributed programs, or distributed applications that can be used to perform the transactions and recordation in the blockchain infrastructure. Smart contracts may include data structures that may keep track of the state of the smart contract, as well as smart contract functions to interact with the smart contract. As the interactions with the smart contracts may only take place through the smart contract functions, the integrity of the state of the smart contract may be preserved. For example, smart contracts may be utilized in the exchange of information regarding users. As another example, smart contracts may be utilized in conjunction with financial transactions, such as payments or loans.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A three-dimensional (3D) printer system for printing structures on a property, comprising:

a 3D printing apparatus comprising an extruder configured to layer material to manufacture a structure; and a controller configured to:

receive a non-fungible token (NFT) comprising a blueprint for a printable structure and a numerical index, wherein the numerical index is a number of allowed printing operations for the blueprint;

receive a request to print the printable structure, wherein the request is associated with a location for the 3D printing apparatus;

determine whether the numerical index is above zero;

determine that the location is at least a threshold distance away from a printed structure that was printed with the blueprint;

in response to determining that the numerical index is above zero and that the location is at least the threshold distance from the printed structure, cause the 3D printing apparatus to manufacture the printable structure based on the blueprint; and subtract one from the numerical index after the 3D printing apparatus has manufactured the printable structure.

2. The system of claim 1, wherein the controller is configured to:

in response to determining that the numerical index is zero, prevent the 3D printing apparatus from manufacturing the printable structure based on the blueprint.

3. The system of claim 2, wherein preventing the 3D printing apparatus from manufacturing the printable structure comprises deactivating the 3D printing apparatus for a period.

4. The system of claim 1, wherein the controller is configured to:

receive an indication that a user associated with the 3D printing apparatus purchased an additional print; and add one to the numerical index.

5. The system of claim 1, wherein the controller is configured to:

receive an image of a misprinted structure, comprising features caused by a faulty printing operation; and in response to authentication of the image, add one to the numerical index.

6. The system of claim 1, wherein the controller is configured to confirm the 3D printing apparatus has manufactured the printable structure based on comparing captured imagery to data from the blueprint.

7. The system of claim 1, wherein the controller is configured to:

cause the 3D printing apparatus to incorporate a radio-frequency identification (RFID) chip in the printable structure during the manufacturing, wherein the RFID chip comprises data concerning the NFT.

8. The system of claim 1, wherein the controller is configured to receive the NFT from a software wallet.

9. The system of claim 1, wherein the numerical index is contained within editable metadata of the NFT.

10. The system of claim 1, wherein the controller is configured to:

in response to detecting that the numerical index is equal to zero, send a notification to a device associated with a user.

11. A tangible, non-transitory, computer-readable medium, comprising computer-readable instructions that, when executed by one or more processors, cause the one or more processors to:

receive a non-fungible token (NFT) comprising a blueprint for a 3D-printable structure and an index, wherein the index indicates a limitation on authorized 3D printing operations for the blueprint;

receive a request to print the 3D-printable structure, wherein the request is associated with a location for a 3D printing apparatus;

in response to the request, determine whether the index indicates authorized 3D printing operations are available and determine that the location is at least a threshold distance away from a 3D-printed structure printed with the blueprint;

in response to determining that the index indicates authorized 3D printing operations are available and that the location is at least the threshold distance away from the 3D-printed structure, cause the 3D printing apparatus to manufacture the 3D-printable structure based on the blueprint; and update the index after the 3D printing apparatus has manufactured the 3D-printable structure to indicate an authorized print has been consumed.

12. The computer-readable medium of claim 11, comprising computer-readable instructions that, when executed by the one or more processors, cause the one or more processors to:

identify that the index is a numerical value of zero; and in response to identifying the index is the numerical value of zero, prevent the 3D printing apparatus from manufacturing the 3D-printable structure based on the blueprint, wherein preventing the 3D printing apparatus from manufacturing the 3D-printable structure comprises deactivating the 3D printing apparatus for a period.

13. The computer-readable medium of claim 11, comprising computer-readable instructions that, when executed by the one or more processors, cause the one or more processors to:

receive an indication that a user associated with the 3D printing apparatus purchased an additional print; and add an authorized print to the index.

14. The computer-readable medium of claim 11, comprising computer-readable instructions that, when executed by the one or more processors, cause the one or more processors to confirm the 3D printing apparatus has manufactured the 3D-printable structure based on comparing captured imagery to data from the blueprint.

15. The computer-readable medium of claim 11, comprising computer-readable instructions that, when executed by the one or more processors, cause the one or more processors to receive the NFT from a software wallet.

16. A method, comprising:

receiving, via a controller, a non-fungible token (NFT) comprising a blueprint for a 3D-printable structure and an index, wherein the index is indicative of a number of allowed 3D printing operations for the blueprint;

receiving, via the controller, a request to print the 3D-printable structure, wherein the request is associated with a location for a 3D printing apparatus;

determining, via the controller, that the index indicates at least one allowed 3D printing operation is available;

determining, via the controller, that the location is at least a threshold distance away from a 3D-printed structure printed with the blueprint;

in response to determining that the index indicates at least one allowed 3D printing operation is available and that the location is at least the threshold distance away from the 3D-printed structure, causing, via the controller, the 3D printing apparatus to manufacture the 3D-printable structure based on the blueprint; and subtracting, via the controller, one authorized print from the index after the 3D printing apparatus has manufactured the 3D-printable structure.

17. The method of claim 16, comprising adjusting, via the controller, the index based on a geological region for a particular printing operation.

18. The method of claim 16, wherein the index is for printing in a geological region and wherein the NFT comprises an additional index for printing in an additional geographical region.

19. The method of claim 16, comprising:

adjusting, via the controller, the index based on the location.

20. The method of 16, comprising:

receiving, via the controller, an indication that a user purchased an additional print; and adding, via the controller, one print authorization to the index.

* * * * *